(12) United States Patent
Chung et al.

(10) Patent No.: US 10,347,421 B2
(45) Date of Patent: Jul. 9, 2019

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si, Gyeonggi-do (KR)

(72) Inventors: Hae Suk Chung, Suwon-si (KR); Byoung Hwa Lee, Suwon-si (KR); Min Cheol Park, Suwon-si (KR); Eun Hyuk Chae, Suwon-si (KR)

(73) Assignee: Samsung Electro-Mechanics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/790,963

(22) Filed: Oct. 23, 2017

(65) Prior Publication Data
US 2018/0061571 A1    Mar. 1, 2018

Related U.S. Application Data

(63) Continuation of application No. 13/768,961, filed on Feb. 15, 2013, now abandoned.

(30) Foreign Application Priority Data

Feb. 17, 2012   (KR) .......................... 10-2012-0016309

(51) Int. Cl.
*H01G 4/012* (2006.01)
*H01G 4/30* (2006.01)
(Continued)

(52) U.S. Cl.
CPC ............... *H01G 4/012* (2013.01); *H01C 7/10* (2013.01); *H01F 17/0013* (2013.01);
(Continued)

(58) Field of Classification Search
CPC ................................. H01G 4/30; H01G 4/228
(Continued)

(56) References Cited

U.S. PATENT DOCUMENTS 4,297,773 A    11/1981  Galvagni
4,749,421 A *   6/1988  Matsui .................... B28B 3/003
                                                        156/276
(Continued)

FOREIGN PATENT DOCUMENTS

CN    1201992 A    12/1998
CN    1702786 A    11/2005
(Continued)

OTHER PUBLICATIONS

Office Action (Decision of Rejection) issued in corresponding Japanese Patent Application No. 2013-000130, dated Oct. 31, 2017 (with full English translation).
(Continued)

*Primary Examiner* — Eric W Thomas
(74) *Attorney, Agent, or Firm* — Morgan, Lewis & Bockius LLP

(57) ABSTRACT

There is provided a multilayer ceramic electronic component, including: a ceramic body having external electrodes; and internal electrodes disposed between ceramic layers within the ceramic body, the ceramic body having a width smaller than a length thereof and the number of laminated internal electrodes being 250 or more, wherein when the thickness of the ceramic layer is denoted by $T_d$ and the thickness of the internal electrode is denoted by $T_e$, $0.5 \leq T_e/T_d \leq 2.0$, and when the thickness of a central portion of the ceramic body is denoted by $T_m$ and the thickness of each of side portions of the ceramic body is denoted by $T_a$, $0.9 \leq T_a/$
(Continued)

$T_m \leq 0.97$, and thus, a multilayer ceramic electronic component having low equivalent series inductance (ESL) may be obtained.

20 Claims, 8 Drawing Sheets

(51) Int. Cl.
| | |
|---|---|
| *H01F 17/00* | (2006.01) |
| *H01C 7/10* | (2006.01) |
| *H01G 4/005* | (2006.01) |
| *H01G 4/12* | (2006.01) |
| *H01F 27/29* | (2006.01) |

(52) U.S. Cl.
CPC .............. *H01G 4/30* (2013.01); *H01F 27/292* (2013.01); *H01G 4/005* (2013.01); *H01G 4/12* (2013.01)

(58) Field of Classification Search
USPC ........................................................... 361/303
See application file for complete search history.

(56) References Cited

U.S. PATENT DOCUMENTS

| | | | |
|---|---|---|---|
| 6,014,309 | A | 1/2000 | Ueno et al. |
| 7,075,775 | B2 | 7/2006 | Yamazaki |
| 7,276,130 | B2 | 10/2007 | Hibi et al. |
| 7,295,420 | B2 | 11/2007 | Kojima et al. |
| 7,298,603 | B2 | 11/2007 | Mizuno et al. |
| 8,305,729 | B2 | 11/2012 | Ito et al. |
| 8,325,462 | B2 | 12/2012 | Abe et al. |
| 8,797,711 | B2 | 8/2014 | Matsumoto et al. |
| 2003/0147194 | A1 | 8/2003 | Hibi et al. |
| 2006/0214263 | A1 | 9/2006 | Kojima et al. |
| 2006/0245141 | A1 | 11/2006 | Shirasu et al. |
| 2006/0256504 | A1 | 11/2006 | Kojima |
| 2008/0310076 | A1 | 12/2008 | Ritter et al. |
| 2009/0316330 | A1 | 12/2009 | Taniguchi et al. |
| 2010/0085682 | A1 | 4/2010 | Abe et al. |
| 2012/0019099 | A1 | 1/2012 | Sato et al. |
| 2012/0019982 | A1* | 1/2012 | Sasaki .................... H01G 4/002 361/321.1 |
| 2013/0229748 | A1* | 9/2013 | Chung ................... H01G 4/005 361/301.4 |

FOREIGN PATENT DOCUMENTS

| | | | |
|---|---|---|---|
| CN | 1855324 | A | 11/2006 |
| CN | 1307666 | C | 3/2007 |
| CN | 101369487 | A | 2/2009 |
| CN | 101714455 | A | 5/2010 |
| JP | 59-28323 | A | 2/1984 |
| JP | S59-043515 | A | 3/1984 |
| JP | S63-136319 | A | 6/1988 |
| JP | 2002-058315 | A | 2/1990 |
| JP | 2005335175 | A | 12/1993 |
| JP | H05335175 | A | 12/1993 |
| JP | H07-106188 | A | 4/1995 |
| JP | 09069463 | A * | 3/1997 |
| JP | H09-232179 | A | 9/1997 |
| JP | H10-097942 | A | 4/1998 |
| JP | H10-214746 | A | 8/1998 |
| JP | H11-147272 | A | 6/1999 |
| JP | 2008-205073 | A | 9/2008 |
| JP | 2010-003891 | A | 1/2010 |
| JP | 2012028458 | A | 2/2012 |
| JP | 60-49621 | B2 | 12/2016 |
| KR | 10-0271910 | B1 | 11/2000 |
| KR | 10-2003-0014712 | A | 2/2003 |

OTHER PUBLICATIONS

U.S. Final Office Action dated Aug. 30, 2017 issued in U.S. Appl. No. 13/768,961.
Chinese Office Action dated Apr. 5, 2017 issued in Chinese Patent Application No. 201310028071.8 with English translation.
Japanese Office Action dated Mar. 28, 2017 issued in Japanese Patent Application No. 2013-000130 with English translation.
U.S. Non-final Office Action dated Apr. 17, 2017 issued in U.S. Appl. No. 13/768,961.
Chinese Office Action dated Aug. 24, 2016, issued in Chinese Patent Application No. 201310028071.8 (with English translation).
U.S. Final Office Action dated Sep. 8, 2016 issued in U.S. Appl. No. 13/768,961.
U.S. Non-final Office Action dated Apr. 22, 2016 issued in U.S. Appl. No. 13/768,961.
U.S. Final Office Action dated Sep. 30, 2015 issued in U.S. Appl. No. 13/768,961.
Multilayer Ceramic Chip Capacitors, NMC Series X7R, NIC Components Corp., pp. 4-6 (2010).
U.S. Non-final Office Action dated Apr. 20, 2015 issued in U.S. Appl. No. 13/768,961.

\* cited by examiner

MULTILAYER CERAMIC ELECTRONIC COMPONENT AND METHOD OF MANUFACTURING THE SAME

CROSS-REFERENCE TO RELATED APPLICATIONS

This application is a continuation of U.S. patent application Ser. No. 13/768,961, filed on Feb. 15, 2013 which claims the priority of Korean Patent Application No. 10-2012-0016309 filed on Feb. 17, 2012, in the Korean Intellectual Property Office, their disclosures of which are incorporated herein by reference.

BACKGROUND OF THE INVENTION

Field of the Invention

The present invention relates to a multilayer ceramic electronic component and a method of manufacturing the same, and more particularly, to a multilayer ceramic electronic component having low equivalent series inductance (ESL).

Description of the Related Art

Recently, as the trend has been for electronic products to be smaller and have a higher capacitance, electronic components used in electronic products have correspondingly been required to be smaller and have a higher capacitance. Accordingly, the need for multilayer ceramic electronic components is increasing.

In the case of multilayer ceramic capacitors, increased equivalent series inductance (hereinafter, "ESL") may cause a deterioration in electronic product performance, and as electronic components come to be smaller and a higher capacitances, the effects of increased ESL in deteriorating electronic component performance have increased.

A so-called "low inductance chip capacitor (LICC)," decreases a distance between external terminals, and thus a current flow path, thereby reducing inductance of capacitance.

However, when a lead-out portion of an internal electrode is compressed, in order to reduce a difference in electrode density between a capacitance part and the lead-out portion of the internal electrode, the internal electrode may be broken or bent, and thus, a current flow path therein may be significantly increased, resulting in increased ESL.

RELATED ART DOCUMENTS

Korean Patent No. 10-0271910
Korean Patent Laid-Open Publication No. 2003-0014712

SUMMARY OF THE INVENTION

An aspect of the present invention provides a multilayer ceramic electronic component having relatively low equivalent series inductance (ESL) and a method of manufacturing the same.

According to one aspect of the present invention, there is provided a multilayer ceramic electronic component, including: a ceramic body having external electrodes; and internal electrodes disposed between ceramic layers within the ceramic body, wherein, when a direction in which the external electrodes are connected and extended is denoted as a ⌈width direction⌋; a direction in which the internal electrodes are laminated is denoted as a ⌈thickness direction⌋; and a direction perpendicular to the width direction and the thickness direction is denoted as a ⌈length direction⌋, the ceramic body has a width smaller than a length thereof, the number of the internal electrodes laminated is 250 or more, when the thickness of the ceramic layer is denoted by $T_d$ and the thickness of the internal electrode is denoted by $T_e$, $0.5 \leq T_e/T_d \leq 2.0$, and when the thickness of a central portion in a width direction of the ceramic body is denoted by $T_m$ and the thickness of each of side portions of the ceramic body is denoted by $T_a$, in a cross section in a width-thickness direction of the ceramic body, $0.9 \leq T_a/T_m \leq 0.97$.

The central portion in the width direction of the ceramic body may be within sections inside 15% of the width of the ceramic body on both sides of a center of the ceramic body in the width direction.

The side portion of the ceramic body may be a section within 10% of the width of the ceramic body from each side of the ceramic body in the width direction.

The internal electrode may include a capacitance formation portion forming capacitance by overlapping the internal electrode and an adjacent internal electrode, and a lead-out portion extended from the capacitance formation portion and led out to an outside of the ceramic body, the lead out portion being thicker than the capacitance formation portion.

The external electrodes may be extended onto side surfaces opposing each other in the width direction of the ceramic body and onto portions of the other surfaces adjacent to the side surfaces.

The thickness of the ceramic layer may be a thickness of the ceramic layer disposed between capacitance formation portions of adjacent internal electrodes.

The thickness of the internal electrode may be a thickness of the capacitance formation portion of the internal electrode.

The cross section in the width-thickness direction may be located within sections inside 40% of the length of the ceramic body on both sides of the center of the ceramic body in the length direction.

According to another aspect of the present invention, there is provided a method of manufacturing a multilayer ceramic electronic component, the method including: preparing a cuboid green chip by laminating 250 or more layers of internal electrodes each interposed between ceramic layers, the cuboid green chip having a smaller width than a length thereof; compressing side portions in a width direction of the green chip such that a ratio of a thickness of a compressed portion to a thickness of an uncompressed portion is 0.9-0.97; sintering the green chip; and forming external electrodes on side surfaces in a width direction of the sintered chip.

In the preparing of the green chip, adjacent internal electrodes may be exposed to opposing surfaces of the green chip, respectively.

In the preparing of the green chip, the internal electrode may be formed such that a lead-out portion thereof is thicker than a capacitance formation portion thereof.

In the compressing, the compression may be performed in a lamination direction of the internal electrodes.

In the forming of the external electrodes, the external electrodes may be extended to portions of the other surfaces adjacent to the side surfaces in the width direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
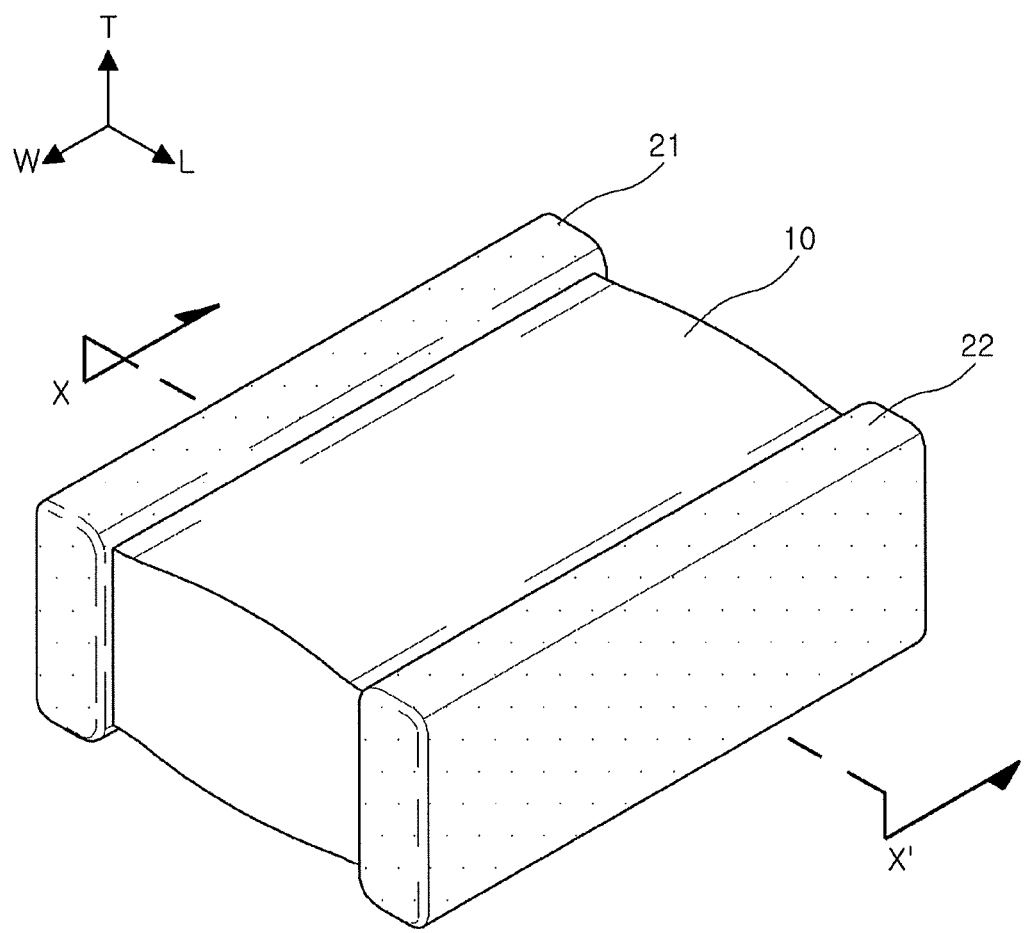
FIG. 1 is a perspective view of a multilayer ceramic electronic component according to an embodiment of the present invention.

Embodiments of the present invention will now be described in detail with reference to the accompanying drawings.

However, the invention may be embodied in many different forms and should not be construed as being limited to the embodiments set forth herein.

The embodiments of the present invention are provided so that those skilled in the art may more completely understand the present invention.

In the drawings, the shapes and dimensions of elements may be exaggerated for clarity, and the same reference numerals will be used throughout to designate the same or like components.

There may be provided, as multilayer ceramic electronic components, multilayer ceramic capacitors, multilayer chip inductors, chip beads, chip varistors, and the like.

Hereinafter, embodiments of the present invention will be described in detail with reference to a multilayer ceramic capacitor, but the present invention should not be seen as being limited thereto.

Figure 2:
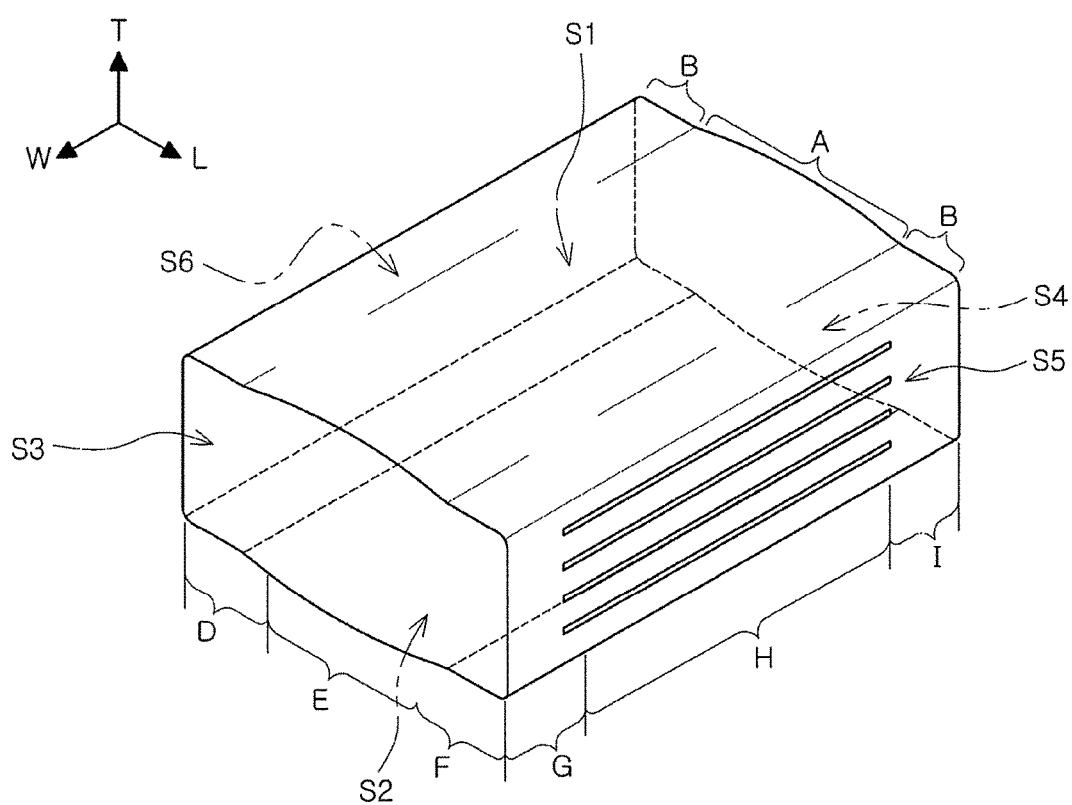
FIG. 2 is a schematic view of a ceramic body according to an embodiment of the present invention.
Figure 3:
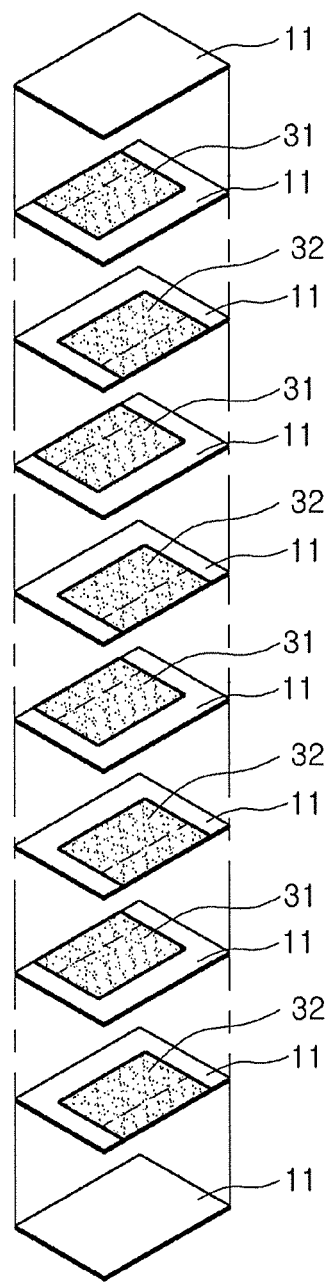
FIG. 3 is an exploded perspective view of FIG. 2.
Figure 4:
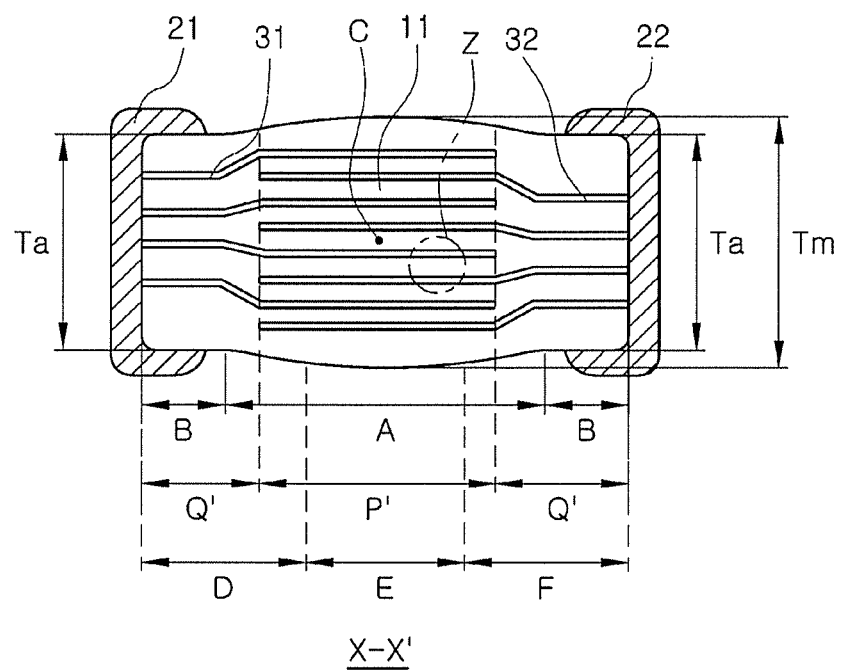
FIG. 4 is a cross-sectional view taken along the line X-X' of FIG. 1.
Figures 7A, 7B:
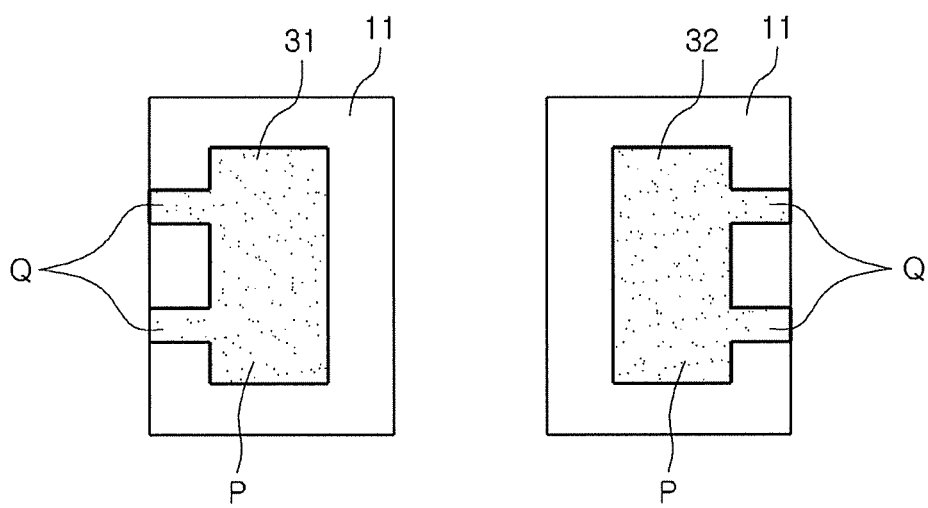
Figure 8:
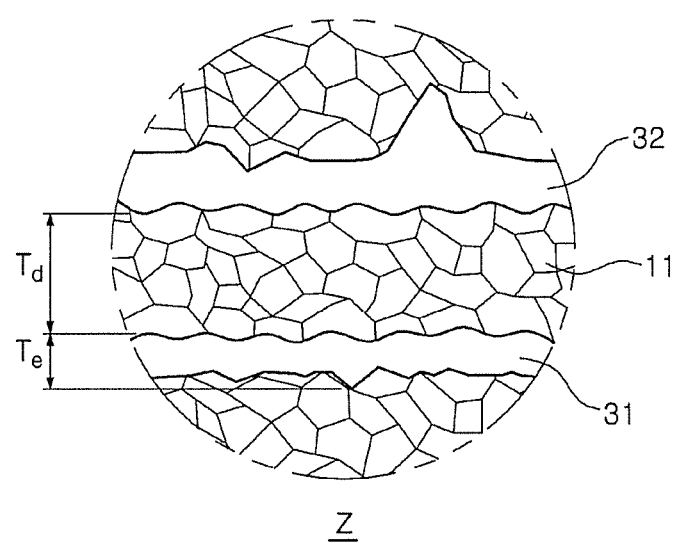
FIG. 8 is a schematic view showing measurement of thicknesses of a ceramic layer and an internal electrode.

FIG. 1 is a perspective view of a multilayer ceramic electronic component according to an embodiment of the present invention; FIG. 2 is a schematic view of a ceramic body according to an embodiment of the present invention; FIG. 3 is an exploded perspective view of FIG. 2; FIG. 4 is a cross-sectional view taken along line X-X' of FIG. 1; FIGS. 5 to 7 are schematic views showing modifications of internal electrodes according to an embodiment of the present invention; and FIG. 8 is a schematic view showing measurement of thicknesses of a ceramic layer and an internal electrode.

Referring to FIG. 1, a multilayer ceramic electronic component according to an embodiment of the present invention may include a ceramic body 10 and external electrodes 21 and 22.

As shown in FIG. 1, a ⌈width direction⌋ may denote a direction in which the external electrodes 21 and 22 are connected and extended ("W direction"); a ⌈lamination direction⌋ or ⌈thickness direction⌋ may denote a direction in which the internal electrodes are laminated ("T direction"); and a ⌈length direction⌋ may denote a direction perpendicular to the width direction and the lamination direction ("L direction").

The ceramic body 10 may be formed of a ceramic material having a relatively high dielectric constant, and without limitation thereto, a barium titanate- or strontium titanate-based material or the like may be used.

The ceramic body 10 may be formed by laminating and then sintering a plurality of ceramic layers, which may be integrated in a single body such that individual adjacent layers may not be readily differentiated from one another.

The ceramic body 10 may be a parallelepiped. Specifically, the ceramic body 10 may have a top surface S1 and a bottom surface S2 opposing each other in a thickness direction, end surfaces S3 and S4 opposing each other in a length direction, and side surfaces S5 and S6 opposing each other in a width direction. However, the ceramic body 10 may not actually have an entirely cuboid shape due to manufacturing process errors or the like.

The width of the ceramic body 10, that is, a distance between external electrodes 21 and 22, is smaller than the length thereof.

In a general laminate ceramic electronic component, external electrodes may be disposed on the end surfaces in the length direction of the ceramic body. In this case, since a current path may be elongated when an alternating current is applied to the external electrodes, the larger current loop may be formed, and the magnitude of the induced magnetic field may be increased, resulting in an increase in inductance.

A distance between the external electrodes 21 and 22, across the ceramic body 10, may be smaller than the length thereof in order to decrease the current path. Hence, the distance between the external electrodes 21 and 22 are small, resulting in a decrease in the current path, and thus, the current loop may be reduced, thereby reducing inductance. As such, the multilayer ceramic electronic component of which the distance between the external electrodes 21 and 22 is smaller than the length thereof may be referred to as a reverse geometry capacitor (RGC) or a low inductance chip capacitor (LICC).

The number of laminated internal electrodes may be 250 or greater.

The defect of an increase in ESL may occur only when the number of laminated internal electrodes 31 and 32 is 250 or greater. The present embodiment is provided to solve this defect, which will be described with reference to Table 1.

The ratio ($T_e/T_d$) of a thickness ($T_e$) of the internal electrode 31 or 32 to a thickness ($T_d$) of the ceramic layer 11 may be 0.5-2.0 or less.

When the ratio $T_e/T_d$ is smaller than 0.5, a defect such as cracking or delamination may not occur. When the ratio $T_e/T_d$ is 0.5 or greater, the defect of cracking or delamination may occur at first. The present embodiment is provided to solve these defects.

When the ratio $T_e/T_d$ is greater than 2.0, the thickness of the internal electrode 31 or 32 is much greater than the thickness of the ceramic layer 11, and thus, cracking or delamination may not be prevented, even when other factors are changed.

Defects such as cracking or delamination, which may occur with respect to the ratio ($T_e/T_d$) of the thickness ($T_e$) of the internal electrode to the thickness ($T_d$) of the ceramic layer, will be explained as follows.

The coefficient of thermal expansion of the internal electrode may be larger than that of the ceramic layer due to the internal electrodes 31 and 32 containing a conductive metal. Stress may therefore be concentrated on an interface between the inner electrode 31 or 32 and the ceramic layer 11 due to repeated expansion and shrinkage through heat history, finally resulting in cracking or delamination.

In cases in which the ratio of the thickness of the internal electrode to the thickness of the ceramic layer is relatively low, stress that may cause cracking or delamination may not be generated due to relatively small degrees of expansion and shrinkage of the internal electrode, hence the defect of cracking or delamination may not occur.

However, in cases in which the ratio of the thickness of the internal electrode to the thickness of the ceramic layer is large, the percentage of the internal electrodes in the ceramic body 10 is larger, and thus, thermal expansion and shrinkage of the internal electrodes may be larger. Therefore, cracking or delamination may occur.

The thickness ($T_d$) of the ceramic layer 11 may refer to an average thickness of the ceramic layer 11 disposed between the internal electrodes 31 and 32.

The average thickness of the ceramic layer 11 may be measured from an image obtained by scanning a cross section in a width-thickness direction of the ceramic body 10 at a magnification of 10,000 times using a scanning electron microscope (SEM), as shown in FIG. 8.

Specifically, an average thickness value of the ceramic layer 11 may be obtained by measuring the thicknesses of 30 regions of the ceramic layer 11 that are equidistant in a width direction, on the scanned image, and then averaging the measured thicknesses.

The 30 regions that are equidistant may be extracted from the capacitance formation portion (P).

In addition, when this method for average measurement is extensively performed on ten ceramic layers 11 and an average thereof is calculated, the average thickness ($T_d$) of the ceramic layer 11 may be further generalized.

The thickness ($T_e$) of the internal electrode 31 or 32 may be the thickness of a capacitance formation portion P of the internal electrode 31 or 32.

The delamination between the internal electrode 31 or 32 and the ceramic layer 11 due to a difference in a coefficient of thermal expansion between the internal electrode 31 or 32 and the ceramic layer 11 may easily occur in the capacitance formation portion P having relatively high electrode density, and thus, the thickness of the capacitance formation portion P of the internal electrode needs to be controlled.

In an area in which lead-out portions of the internal electrodes 31 or 32 overlap each other and thus electrode density is low, since the percentage of the internal electrodes 31 or 32 is relatively small in the ceramic body 10, delamination due to a difference in a coefficient of thermal expansion between the internal electrode 31 or 32 and the ceramic layer 11 may occur relatively less.

When, in a cross section in the width-thickness direction (W-T cross section), the thickness of a central portion (E) in the width direction of the ceramic body 10 is denoted by $T_m$ and the thickness of a side portion (B) of the ceramic body 10 is denoted by $T_a$, $0.9 \leq T_a/T_m \leq 0.97$ may be satisfied.

In the multilayer ceramic capacitor, the area in which the capacitance formation portions (P) of the internal electrodes 31 and 32 overlap each other is different from the area in which the lead-out portions (Q) of the internal electrodes 31 or 32 in view of density of the internal electrode. That is to say, the area in which the capacitance formation portions (P) overlap each other is greater than the area in which the lead-out portions are formed, in view of electrode density.

Here, electrode density may refer to the percentage of the area of the internal electrodes 31 and 32 in the overall area of the cross section in the width-thickness direction (W-T cross section).

In order to reduce a difference in electrode density of the internal electrodes 31 and 32, the area (Q') in which the lead-out portions (Q) overlap each other may be compressed. The compression may be performed for an appropriate time period and at an appropriate pressure, considering the thickness of the internal electrodes 31 and 32, the thickness of the ceramic layer 11, the dimensions of the ceramic body 10, and the like.

The internal electrodes 31 and 32 may be broken or bent at a boundary between the compressed portion (B) and the uncompressed portion A. In this case, a current path and the current loop may further increased, resulting in an increase in ESL.

This phenomenon may occur relatively more in the case of RGC or LICC in which a distance between the external electrodes 21 and 22 is relatively short.

The thickness ($T_m$) of the central portion (E) of the ceramic body 10 may be defined by a distance from the lowest point protruding downwardly to the highest point protruding upwardly in the central portion (E) in the width direction of the ceramic body 10.

The central portion (E) in the width direction of the ceramic body 10, as shown in FIGS. 2 and 4, may be within sections inside 15% of the width of the ceramic body 10 on both sides of the center (C) of the ceramic body 10 in the width direction.

The reason is that a middle portion A of the ceramic body 10 may protrude upwardly and downwardly since the side portions B thereof are compressed, and here, the highest point and the lowest point of the protruding portion may be formed within the above range.

Each of the side portions (B) of the ceramic body 10 may be a section within 10% of the width of the ceramic body 10 from each side of the ceramic body 10 in the width direction.

The thickness of the side portion (B) of the ceramic body 10 may be an average thickness.

Since the ceramic body 10 is compressed above and below in a lamination direction of the internal electrodes 31 and 32, the compressed side portion (B) may be flat and the thickness from a bottom surface to a top surface of the compressed portion (B) may be denoted by a thickness ($T_a$) of the side portion (B) of the ceramic body 10.

When $T_a/T_m$ is smaller than 0.9, the current path and the current loop may increase, resulting in an increase in ESL. When $T_a/T_m$ is greater than 0.97, delamination may occur.

When the ratio ($T_a/T_m$) of the thickness ($T_a$) of the side portion (B) to the thickness ($T_m$) of the central portion (E) in the width direction of the ceramic body 10 is increased by strong compression, binding strength between the internal electrodes 31 and 32 and the ceramic layers 11 may be increased, but ESL may increase due to an increase in the current path.

On the contrary, in the case of relatively weak compression, the current path is only slightly increased, which may not cause the defect of an increase in ESL, but binding strength between the internal electrodes 31 and 32 and the ceramic layers 11 may be relatively reduced, which may result in delamination.

The cross section in the width-thickness direction (W-T cross section) may be located within sections inside 40% of the length of the ceramic body 10 on both sides of the center (C) of the ceramic body 10 in the length direction.

The reason is that the thickness ($T_d$) of the ceramic body 10 may be stable within the above range, but not stable outside of the above range.

The thicknesses of the both portions (B) of the ceramic body 10 may be the same.

Tombstone defects may be prevented by forming the ceramic body 10 to have a symmetrical structure.

The ceramic body 10, without being limited thereto, may include barium titanate or strontium titanate. A ceramic body 10 that can include a ceramic material having a relatively high dielectric constant may be used.

When a dielectric material having a high dielectric constant is located between electrodes having different polarities, electric dipoles present in the dielectric material may be arranged due to a reaction by an external electric field. Therefore, more charges may be induced in the electrodes, and thus, more electrical energy may be accumulated.

The internal electrodes 31 and 32 may be laminated within the ceramic body 10 such that each of the internal electrodes 31 and 32 may be interposed between the ceramic layers 11.

The internal electrode 31 or 32 may include the capacitance formation portion (P) that contributes to capacitance formation by overlapping with the adjacent internal electrode 31 or 32 and the lead-out portion (Q) that is extended from a portion of the capacitance formation portion (P) and led out to the outside of the ceramic body 10.

In each of the internal electrodes 31 and 32, the lead-out portion (Q) may be thicker than the capacitance formation portion (P).

As for the ceramic body 10, a region (P') in which the capacitance formation portions (P) overlap each other is higher than a region (Q') in which the lead-out portions (Q) overlap each other in view of electrode density. Compression may be performed on the region (Q') where the lead-out portions (Q) overlap each other in order to reduce the difference in electrode density.

Apart from the compression, the lead-out portions (Q) of the internal electrodes 31 and 32 may be thicker than the capacitance formation portions (P) thereof in order to reduce the difference in electrode density.

The internal electrodes 31 and 32 may be formed by a method such as screen-printing a conductive paste or the like. The screen printing may be performed several times for the lead-out portions (Q) of the internal electrodes 31 and 32, thereby forming the lead-out portions (Q) to be thicker than the capacitance formation portions (P).

FIGS. 5 to 7 show modifications of the internal electrodes 31 and 32.

Figures 5A, 5B:
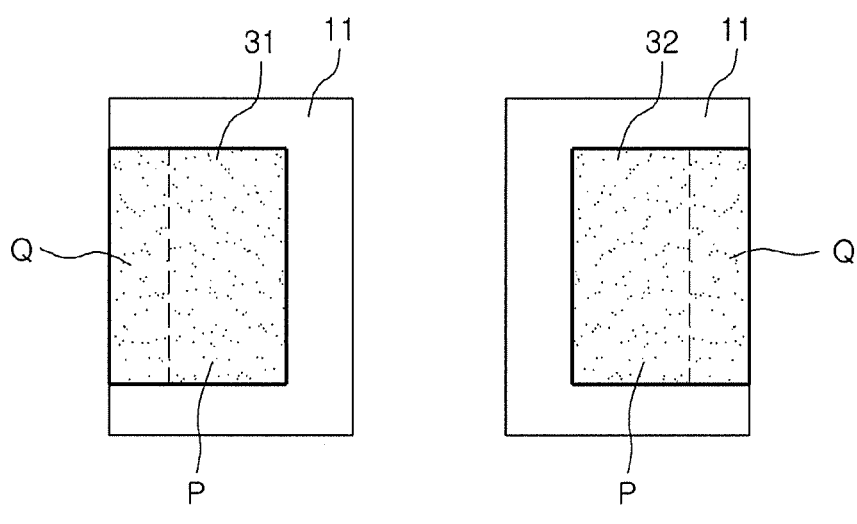
FIGS. 5A, 5B, 6A, 6B, 7A, and 7B are schematic views showing modifications of internal electrodes according to embodiments of the present invention.
Figures 6A, 6B:
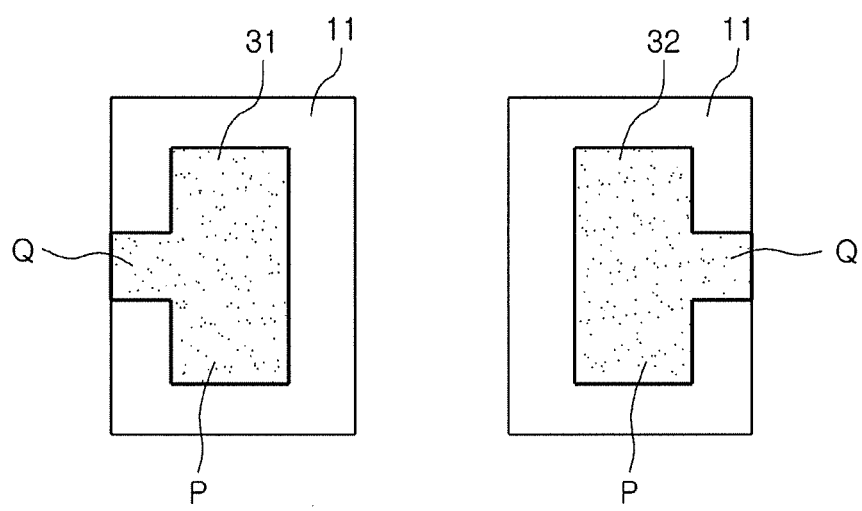

FIGS. 5A and 5B show cases in which the capacitance formation portions (P) of the internal electrodes 31 and 32 are extended to form the lead-out portions (Q) thereof, and FIGS. 6A and 6B show cases in which the lead-out portions (Q) are smaller than the capacitance formation portions (P). FIGS. 7A and 7B show cases in which each of the lead-out portions (Q) is divided into two. However, the shapes of the internal electrodes 31 and 32 are not limited to the cases of FIGS. 5 to 7, and may be varied as necessary.

Referring to FIG. 8, the thickness ($T_e$) of each of the internal electrodes 31 and 32 may be measured from an image obtained by scanning a cross section in a width-thickness direction (W-T cross section) of the ceramic body 10 using a scanning electron microscope (SEM).

For example, as shown in FIG. 8, the average thickness of the internal electrode 31 or 32 may be obtained by measuring the thicknesses of 30 regions that are equidistant in a width direction, on an image of any internal electrode 31 or 32 extracted from the image obtained by scanning a cross section in a width-thickness direction (W-T cross section), which is cut in the central portion (H) in a length direction of the ceramic body 10, at a magnification of 10,000 times using a scanning electron microscope (SEM), and then averaging the measured thicknesses.

The central portion (H) in the length direction of the ceramic body 10, as shown in FIGS. 2 and 4, may be within sections inside 40% of the length of the ceramic body 10 on both sides of the center (C) of the ceramic body 10 in the length direction. The reason is that each thickness ($T_e$) of the internal electrodes 31 and 32 has a stable value within the above-described range.

The 30 regions that are equidistant may be extracted from the capacitance formation portion (P) of the internal electrode 31 or 32.

In addition, when this method for average measurement is extensively performed on ten or more internal electrodes 31 or 32 and an average thereof is calculated, the average thickness ($T_e$) of the internal electrode 31 or 32 may be further generalized.

The internal electrodes 31 and 32 may include at least one selected from the group consisting of gold, silver, copper, nickel, palladium, and an alloy thereof. However, without being limited thereto, any metal that can confer conductivity to the internal electrodes 31 and 32 may be used.

Noble metals such as gold, silver, palladium and the like are expensive, but oxidation defects present do not need to be considered at the time of sintering. Base metals such as nickel and the like are relatively cheap, and thus, may have strength in costs, but the sintering state needs to be maintained in a reduction atmosphere in order to prevent oxidation of the metals.

The external electrodes 21 and 22 may be extended onto the side surfaces (S5 and S6) opposing each other in the width direction of the ceramic body 10 and onto portions of the surfaces (S1 to S4) adjacent to the side surfaces (S5 and S6).

The external electrodes 21 and 22 may cover the compressed side portions of the ceramic body 10.

The external electrodes 21 and 22 are not limited thereto, but may include conductive metals such as copper and the like, and a glass component may be further added thereinto in order to improve compactness thereof.

According to another embodiment of the present invention, there is provided a method of manufacturing a multilayer ceramic electronic component, the method including: preparing a cuboid green chip by laminating 250 or more layers of internal electrodes each interposed between ceramic layers, the cuboid green chip having a smaller width than a length thereof; compressing side portions in a width direction of the green chip such that a ratio of thickness of a compressed portion to thickness of an uncompressed portion is 0.9-0.97; sintering the green chip; and forming the external electrodes on side surfaces in a width direction of the sintered chip.

First, a cuboid green chip having a smaller width than a length thereof may be prepared by laminating 250 or more layers of internal electrodes each interposed between green ceramic layers.

A ceramic slurry may be prepared by mixing a ceramic powder, an organic solvent, a binder, and the like and conducting ball milling, and then a doctor blade method or the like using the ceramic slurry may be preformed to form thin green sheets.

A conductive paste including a conductive metal may be prepared in the same manner as the ceramic slurry, and a screen printing method or the like using the conductive paste may be performed to form the internal electrodes on the green sheets, respectively.

250 or more layers of green sheets on which the internal electrodes have been formed may be laminated and compressed to form a green sheet laminate, which may be then cut to manufacture the green chip.

The internal electrodes may be exposed to opposing surfaces of the green chip, and a direction in which the surfaces to which the internal electrodes are exposed are extended may be denoted by a width direction. The green chip may have a cuboid of which the width, that is, a distance between the external electrodes, is smaller than the length.

The reason for this is that a distance between external terminals is decreased to reduce the current path, and thus, ESL may be reduced in the capacitor. That is to say, the reason for the above-detailed conditions is for manufacturing an RGC or LICC.

The internal electrode may include a capacitance formation portion contributing to capacitance formation and a lead-out portion extended from the capacitance formation portion and led out to the outside of the green chip, and here, the lead out portion may be thicker than the capacitance formation portion.

The reason is for reducing a difference in electrode density between a region in which the capacitance formation portions overlap each other and a region in which the lead out portions overlap each other.

Next, side portions in a width direction of the green chip may be compressed, and the compression may be performed in a lamination direction of the internal electrodes.

In the green chip, the number of laminated internal electrodes in the region in which the capacitance formation portions overlap each other is 2 times the number of laminated internal electrodes in the region in which the lead out portions overlap each other, and thus the electrode density may be larger in the region in which the capacitance formation portions overlap each other than in the region in which the lead out portions overlap each other. The region in which the lead out portions overlap each other may be compressed in a thickness direction in order to reduce a difference in electrode density.

However, when the compression is too large, the internal electrodes may be excessively broken or bent proportionally, and thus the current path may be increased, resulting in an increase in ESL. When the compression is too small, binding strength between the green ceramic layer and the internal electrode may not be sufficient, resulting in delamination. The above defects may not occur when the ratio of thickness of the compressed portion to thickness of the uncompressed portion in the green chip is 0.9-0.97.

Then, the green chip may be sintered.

Before sintering, a calcining process may be performed at a temperature lower than the sintering temperature. The organic materials present in the green chip may be removed by the calcining process. In the case in which a base metal such as nickel or the like is used for the internal electrode, the internal electrode may be oxidized to reduce conductivity thereof, and thus, sintering may need to be performed at the reduction atmosphere.

Then, external electrodes may be formed on side surfaces in a width direction of the sintered chip. The external electrodes may be extended to portions of the other surfaces adjacent to the side surfaces in the width direction of the sintered chip. The external electrodes may be formed by a printing or dipping method using a paste including a conductive metal. Here, a glass component may be further added into the paste, thereby to improve compactness of the external electrode, and prevent infiltration of a plating liquid during a plating process which will be performed later.

Then, plating layers may be formed on the external electrodes for easy soldering. The plating layers may be nickel or tin plating layers.

The ceramic body may include barium titanate.

The internal electrodes may include at least one selected from the group consisting of gold, silver, copper, nickel, palladium, and an alloy thereof.

The external electrodes may include copper.

Other details of the ceramic body, the internal electrodes, the external electrodes, and the like are the same as described above.

Hereinafter, the present invention will be described with reference to inventive examples and comparative examples.

Each of multilayer ceramic capacitors according to the inventive examples of the present invention and comparative examples was manufactured by the following method.

A ceramic slurry was prepared by mixing ethanol as an organic solvent, and ethyl cellulose as a binder, with a barium titanate powder, followed by ball milling using zirconia balls. The ceramic slurry was coated on a polyethylene film by a doctor blade method, and then dried, thereby forming ceramic green sheets.

A conductive paste was prepared by mixing ethanol as an organic solvent, and ethyl cellulose as a binder, with a nickel powder, followed by ball milling.

Internal electrodes were, respectively, formed on the ceramic green sheets by using the conductive paste.

A ceramic green sheet laminate was manufactured by laminating the ceramic green sheets on which the internal electrodes were formed, and then the ceramic green sheet laminate was cut to provide a green chip. The number of laminated internal electrodes was 240, 250, and 260.

The green chip was sintered in a reduction atmosphere at a temperature of 1000° C., thereby obtaining a sintered chip.

External electrodes were formed on the sintered chip by using a conductive paste containing copper as a main component, and thus, the multilayer ceramic capacitor was finally manufactured.

First, in order to confirm the appropriateness of the number of laminated internal electrodes, multilayer ceramic capacitors were manufactured while the number of laminated internal electrodes and the ratio ($T_e/T_d$) of the thickness ($T_e$) of the internal electrode 31 or 32 to the thickness ($T_d$) of the ceramic layer 11 were varied, and then ESL values thereof were measured. The results were tabulated in Table 1.

Specifically, the ESL values of the multilayer ceramic capacitors were measured while the number of laminated internal electrodes 31 or 32 was varied to 240, 250, and 260, and $T_e/T_d$ was varied to 0.4, 0.6, 1.0, and 1.4. The ESL value was measured by using a vector network analyzer (VNA), after a chip was mounted on a substrate.

TABLE 1

| | Number of laminated internal electrodes | $T_e$ | $T_d$ | $T_e/T_d$ | ESL |
|---|---|---|---|---|---|
| Sample 1 | 240 | 0.6 | 1.5 | 0.4 | 90 |
| Sample 2 | | 0.75 | 1.5 | 0.5 | 91 |
| Sample 3 | | 1.5 | 1.5 | 1 | 93 |
| Sample 4 | | 2.1 | 1.5 | 1.4 | 94 |
| Sample 5 | 250 | 0.6 | 1.5 | 0.4 | 94 |
| Sample 6 | | 0.75 | 1.5 | 0.5 | 102 |
| Sample 7 | | 1.5 | 1.5 | 1 | 104 |
| Sample 8 | | 2.1 | 1.5 | 1.4 | 107 |
| Sample 9 | 260 | 0.6 | 1.5 | 0.4 | 96 |
| Sample 10 | | 0.75 | 1.5 | 0.5 | 103 |
| Sample 11 | | 1.5 | 1.5 | 1 | 106 |
| Sample 12 | | 2.1 | 1.5 | 1.4 | 109 |

As shown in Table 1, in Samples 1 to 4 in which the number of laminated internal electrodes was 240 and $T_e/T_d$ values were respectively 0.4, 0.5, 1.0, and 1.4, ESL values thereof were 90 pH, 91 pH, 93 pH, and 94 pH, respectively. The ESL values were relatively small regardless of the $T_e/T_d$ values. The unit of ESL is picohenry "pH".

Sample 5, in which the number of laminated internal electrodes was 250 and the $T_e/T_d$ value was 0.4, exhibited an ESL value of 94 pH; Sample 6, in which the number of laminated internal electrodes was 250 and the $T_e/T_d$ value was 0.5, exhibited an ESL value of 102 pH; Sample 7, in which the number of laminated internal electrodes was 250 and the $T_e/T_d$ value was 1.0, exhibited an ESL value of 104 pH; and Sample 8, in which the number of laminated internal electrodes was 250 and the $T_e/T_d$ value was 1.4, exhibited an ESL value of 102 pH.

It may be confirmed from Samples 5 to 8 that the ESL value did not increase when the number of laminated internal electrodes 31 and 32 was 250 and the $T_e/T_d$ value was 0.4, but the ESL abruptly increased when the $T_e/T_d$ value was 0.5 or greater.

Also, Samples 9 to 12, in which the number of laminated internal electrodes was 260, had the same results as the cases in which the number of laminated internal electrodes was 250.

In conclusion, it may be confirmed from Table 1 above that the ESL value abruptly increased when the number of laminated internal electrodes 31 and 32 was 250 or more and the $T_e/T_d$ value was 0.5 or greater.

Embodiments of the present invention may be provided to solve the defects occurring in the cases in which the number of laminated internal electrodes 31 and 32 was 250 or more and the $T_e/T_d$ value was 0.5 or greater.

Next, in order to confirm the appropriateness of the ratio $(T_a/T_m)$ of the thickness $(T_a)$ of the side portion (B) to the thickness $(T_m)$ of the central portion (E) in the width direction of the ceramic body 10, the ESL value of each multilayer ceramic capacitor manufactured by the above method was measured, and also the thicknesses ($T_a$ and $T_m$) of the ceramic body, the thickness $(T_d)$ of the ceramic layer, and the thickness $(T_e)$ of the internal electrode were measured from an SEM image of the W-T cross section that is polished. Also, it was observed whether or not delamination occurred. The results were shown in Table 2.

Specifically, the ESL values of the multilayer ceramic capacitors were measured while the number of laminated internal electrodes was 270 and the $T_e/T_d$ value was varied to 0.5, 1.0, 2.0, and 2.2 while the $T_a/T_m$ value was varied to 0.88, 0.90, 0.93, 0.96, and 0.98 for each of the $T_e/T_d$ values. The thickness $(T_d)$ of the ceramic layer and the thickness $(T_e)$ of the internal electrode were measured in the manner as described above.

TABLE 2

| | $T_e$ (μm) | $T_d$ (μm) | $T_e/T_d$ | $T_a$ (μm) | $T_m$ (μm) | $T_a/T_m$ | ESL (pH) | Delamination |
|---|---|---|---|---|---|---|---|---|
| Comparative Example 1 | 0.5 | 1 | 0.5 | 430 | 488 | 0.88 | 113 | No |
| Inventive Example 1 | | | | 440 | 488 | 0.90 | 95 | No |
| Inventive Example 2 | | | | 455 | 488 | 0.93 | 93 | No |
| Inventive Example 3 | | | | 470 | 488 | 0.96 | 91 | No |
| Comparative Example 2 | | | | 480 | 488 | 0.98 | 90 | Occurred |
| Comparative Example 3 | 1.0 | 1 | 1.0 | 520 | 590 | 0.88 | 114 | No |

TABLE 2-continued

| | $T_e$ (μm) | $T_d$ (μm) | $T_e/T_d$ | $T_a$ (μm) | $T_m$ (μm) | $T_a/T_m$ | ESL (pH) | Delamination |
|---|---|---|---|---|---|---|---|---|
| Inventive Example 4 | | | | 530 | 590 | 0.90 | 94 | No |
| Inventive Example 5 | | | | 550 | 590 | 0.93 | 92 | No |
| Inventive Example 6 | | | | 565 | 590 | 0.96 | 91 | No |
| Comparative Example 4 | | | | 580 | 590 | 0.98 | 90 | Occurred |
| Comparative Example 5 | 2.0 | 1 | 2.0 | 740 | 845 | 0.88 | 115 | No |
| Inventive Example 7 | | | | 760 | 845 | 0.90 | 96 | No |
| Inventive Example 8 | | | | 790 | 845 | 0.93 | 93 | No |
| Inventive Example 9 | | | | 810 | 845 | 0.96 | 92 | No |
| Comparative Example 6 | | | | 830 | 845 | 0.98 | 91 | Occurred |
| Comparative Example 7 | 2.2 | 1 | 2.2 | 790 | 896 | 0.88 | 117 | Occurred |
| Comparative Example 8 | | | | 810 | 896 | 0.90 | 96 | Occurred |
| Comparative Example 9 | | | | 830 | 896 | 0.93 | 94 | Occurred |
| Comparative Example 10 | | | | 860 | 896 | 0.96 | 93 | Occurred |
| Comparative Example 11 | | | | 880 | 896 | 0.98 | 92 | Occurred |

Referring to Table 2, comparative example 1 having a $T_e/T_d$ value of 0.5 and a $T_a/T_m$ value of 0.88 exhibited an ESL value of 113 pH and no delamination. This is likely that the thickness of the side portion in the width direction of the ceramic body was remarkably decreased due to strong compression, resulting in an increased current path and an increased ESL value, but delamination did not occur due to strong compression.

Inventive examples 1 to 3 having $T_e/T_d$ values of all 0.5 and $T_a/T_m$ values of 0.90, 0.93 and 0.96, respectively, exhibited ESL values of 95 pH, 93 pH and 91 pH, respectively, and all no delamination.

Comparative example 2 having a $T_e/T_d$ value of 0.5 and a $T_a/T_m$ value of 0.98 exhibited an ESL value of 90 pH and delamination. This is likely that weak compression leaded a small increase in current path and a small increase in ESL, but binding strength between the internal electrode and the ceramic layer, which are formed of different kinds of materials, is reduced, resulting in delamination.

Comparative example 3, inventive examples 4 to 6, and comparative example 4, which had the $T_e/T_d$ values of all 1.0, exhibited the same results as the cases in which the $T_e/T_d$ value was 0.5.

Also, comparative example 5, inventive examples 7 to 9, and comparative example 6, which had the $T_e/T_d$ values of all 2.0, exhibited the same results as the cases in which the $T_e/T_d$ value was 0.5.

All of comparative examples 7 to 11 having the $T_e/T_d$ values of all 2.2 exhibited delamination. It is likely that the stress generated due to repetitive thermal expansion and thermal shrinkage of the internal electrodes was relatively strong because the internal electrodes were relatively thick, and thus, delamination occurred due to this stress.

In conclusion, when the number of laminated internal electrodes was 270 and the $T_e/T_d$ value and the $T_a/T_m$ value were 0.6-2.0 and 0.9-0.97, respectively, the ESL value was relatively small and delamination did not occur.

As set forth above, according to the embodiments of the present invention, a multilayer ceramic electronic component having relatively low equivalent series inductance (ESL) may be obtained.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body having first and second external electrodes; and
   internal electrodes sequentially disposed between ceramic layers within the ceramic body and alternately connected to the first and second external electrodes, the multilayer ceramic electronic component including a capacitance formation portion forming capacitance in which internal electrodes connected to different ones of the first and second external electrodes overlap each other, and a lead-out portion extended from the capacitance formation portion and led out to an outside of the ceramic body,
   wherein a direction between external electrodes across the ceramic body is denoted as a width direction; a direction in which the internal electrodes are laminated is denoted as a thickness direction; and a direction perpendicular to the width direction and the thickness direction is denoted as a length direction,
   wherein the ceramic body has a side portion and a central portion disposed adjacently in the width direction of the ceramic body, and the central portion has a greater thickness than that of the side portion,
   wherein the levels of upper surfaces in the central portion and in the side portion of each of the internal electrodes are different from each other,
   wherein a portion of each of first outermost internal electrodes, among all of the internal electrodes connected to the first external electrode, connecting other portions thereof in the central portion and the side portion has an inclined orientation with regard to the other portions thereof, and a portion of one internal electrode, among all of the internal electrodes connected to the first external electrode and between the first outermost electrodes, connecting other portions thereof in the central portion and the side portion has an inclined orientation with regard to the other portions thereof,
   wherein a portion of each of second outmost internal electrodes, among all of the internal electrodes connected to the second external electrode, connecting other portions thereof in the central portion and the side portion has an inclined orientation with regard to the other portions thereof, and a portion of one internal electrode, among all of the internal electrodes connected to the second external electrode and between the second outmost electrodes, connecting other portions thereof in the central portion and the side portion has an inclined orientation with regard to the other portions thereof,
   wherein, in each of the internal electrodes, all portions having the inclined orientation are disposed outside of the capacitance formation portion in which internal electrodes connected to different ones of the first and second external electrodes overlap each other, and
   wherein a thickness of the ceramic body at all locations in which the internal electrodes have the inclined orientation is less than a maximum thickness of the body in the central portion.

2. The multilayer ceramic electronic component of claim 1, wherein a central portion in the width direction of the ceramic body is within sections inside 15% of the overall width of the ceramic body on both sides of a center of the ceramic body in the width direction.

3. The multilayer ceramic electronic component of claim 1, wherein the side portion of the ceramic body in a width direction of the ceramic body is within 10% of the overall width of the ceramic body from a side of the ceramic body in the width direction.

4. The multilayer ceramic electronic component of claim 1, wherein the external electrodes are extended onto side surfaces opposing each other in the width direction of the ceramic body and onto portions of the other surfaces adjacent to the side surfaces.

5. The multilayer ceramic electronic component of claim 1, wherein a thickness of the ceramic layer is a thickness of the ceramic layer disposed between the capacitance formation portions of adjacent internal electrodes.

6. The multilayer ceramic electronic component of claim 1, wherein a thickness of the internal electrode is a thickness of the capacitance formation portion of the internal electrode.

7. The multilayer ceramic electronic component of claim 1, wherein a cross section in the width-thickness direction is located within sections inside 40% of the length of the ceramic body on both sides of the center of the ceramic body in the length direction.

8. The multilayer ceramic electronic component of claim 1, wherein:
   the number of the internal electrodes is 250 or more;
   when the thickness of the ceramic layer is denoted by Td and the thickness of the internal electrode is denoted by Te, $0.5 \leq Te/Td \leq 2.0$; and
   when the thickness of a central portion in a width direction of the ceramic body is denoted by Tm and the thickness of the side portion of the ceramic body is denoted by Ta, in a cross section in a width-thickness direction of the ceramic body, $0.9 \leq Ta/Tm \leq 0.97$.

9. The multilayer ceramic electronic component of claim 1, wherein a portion of the ceramic body that overlaps, in the thickness direction, with the portions of each of the internal electrodes having the inclined orientation is free of the external electrodes.

10. The multilayer ceramic electronic component of claim 1, wherein each internal electrode has a larger thickness in a lead-out portion thereof than in a capacitance formation portion thereof.

11. The multilayer ceramic electronic component of claim 1, wherein the ceramic body has a width smaller than a length thereof.

12. The multilayer ceramic electronic component of claim 1, wherein in the capacitance formation portion, each of the internal electrodes is flat.

13. A multilayer ceramic electronic component, comprising:
   a ceramic body having first and second external electrodes; and
   internal electrodes sequentially disposed between ceramic layers within the ceramic body and alternately connected to the first and second external electrodes, the multilayer ceramic electronic component including a capacitance formation portion forming capacitance in which internal electrodes connected to different ones of the first and second external electrodes overlap each other, and a lead-out portion extended from the capacitance formation portion and led out to an outside of the ceramic body, wherein a direction between external electrodes across the ceramic body is denoted as a width direction; a direction in which the internal electrodes are laminated is denoted as a thickness direction; and a direction perpendicular to the width direction and the thickness direction is denoted as a length direction, wherein the ceramic body has a side portion and a central portion disposed adjacently in the width direction of the ceramic body, and the central portion has a greater thickness than that of the side portion, wherein the levels of upper surfaces in the central portion and in the side portion of each of the internal electrodes are different from each other, wherein a portion of each of the internal electrodes connecting other portions thereof in the central portion and the side portion has an inclined orientation with regard to the other portions, wherein, in each of the internal electrodes, all portions having the inclined orientation are disposed outside of the capacitance formation portion in which internal electrodes connected to different ones of the first and second external electrodes overlap each other, wherein a thickness of the ceramic body at all locations in which the internal electrodes have the inclined orientation is less than a maximum thickness of the body in the central portion, and wherein a degree of inclination of outermost internal electrodes among the internal electrodes is greater than a degree of inclination of internal electrodes disposed between the outermost internal electrodes.

14. The multilayer ceramic electronic component of claim 13, wherein a central portion in the width direction of the ceramic body is within sections inside 15% of the overall width of the ceramic body on both sides of a center of the ceramic body in the width direction.

15. The multilayer ceramic electronic component of claim 13, wherein the side portion of the ceramic body in a width direction of the ceramic body is within 10% of the overall width of the ceramic body from a side of the ceramic body in the width direction.

16. The multilayer ceramic electronic component of claim 13, wherein a cross section in the width-thickness direction is located within sections inside 40% of the length of the ceramic body on both sides of the center of the ceramic body in the length direction.

17. The multilayer ceramic electronic component of claim 13, wherein:
the number of the internal electrodes is 250 or more;
when the thickness of the ceramic layer is denoted by Td and the thickness of the internal electrode is denoted by Te, $0.5 \leq Te/Td \leq 2.0$; and
when the thickness of a central portion in a width direction of the ceramic body is denoted by Tm and the thickness of the side portion of the ceramic body is denoted by Ta, in a cross section in a width-thickness direction of the ceramic body, $0.9 \leq Ta/Tm \leq 0.97$.

18. The multilayer ceramic electronic component of claim 13, wherein a portion of the ceramic body that overlaps, in the thickness direction, with the portions of each of the internal electrodes having the inclined orientation is free of the external electrodes.

19. The multilayer ceramic electronic component of claim 13, wherein each internal electrode has a larger thickness in a lead-out portion thereof than in a capacitance formation portion thereof.

20. The multilayer ceramic electronic component of claim 13, wherein in the capacitance formation portion, each of the internal electrodes is flat.

* * * * *